US012711733B1

(12) United States Patent
Jia et al.

(10) Patent No.: US 12,711,733 B1
(45) Date of Patent: Aug. 18, 2026

(54) AUTONOMOUS MOBILE MACHINE, CONTROLLER, AND POINT CLOUD MATCHING STATE CONFIRMATION METHOD FOR AUTONOMOUS MOBILE MACHINE

(71) Applicant: VisionNav Robotics USA Inc., Acworth, GA (US)

(72) Inventors: Shuai Jia, Acworth, GA (US); Yujie Lu, Acworth, GA (US); Fan Zheng, Acworth, GA (US); Jianhong Xu, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/371,827

(22) Filed: Oct. 28, 2025

(51) Int. Cl.

| | |
|---|---|
| ***G06V 10/75*** | (2022.01) |
| ***B66F 17/00*** | (2006.01) |
| ***G05D 1/43*** | (2024.01) |
| ***G05D 1/648*** | (2024.01) |
| ***G05D 105/28*** | (2024.01) |
| ***G05D 109/10*** | (2024.01) |

(Continued)

(52) U.S. Cl.
CPC .......... *G06V 10/757* (2022.01); *B66F 17/003* (2013.01); *G05D 1/43* (2024.01); *G05D 1/648* (2024.01); *G06T 7/337* (2017.01); *G06T 7/74* (2017.01); *G06V 10/753* (2022.01); *G05D 2105/28* (2024.01); *G05D 2109/135* (2024.01); *G06T 2207/10028* (2013.01); *G06T 2207/30252* (2013.01)

(58) Field of Classification Search
CPC ... G06V 10/757; G06V 10/753; B66F 17/003; G05D 1/43; G05D 1/648; G05D 2105/28; G06T 7/337; G06T 7/74; G06T 2207/10028; G06T 2207/30252
USPC .......................................................... 701/24
See application file for complete search history.

(56) References Cited

U.S. PATENT DOCUMENTS 10,831,188 B2 * 11/2020 Hammond ........... G05D 1/0055
2018/0313942 A1 * 11/2018 Wu ......................... G01S 17/42
(Continued)

FOREIGN PATENT DOCUMENTS

| | | |
|---|---|---|
| CN | 112489212 B | 5/2022 |
| CN | 116734838 A | 9/2023 |
| CN | 118485679 A | 8/2024 |

*Primary Examiner* — Krishnan Ramesh
(74) *Attorney, Agent, or Firm* — MUNCY, GEISSLER, OLDS & LOWE, P.C.

(57) ABSTRACT

Some embodiments of the present disclosure relate to an autonomous mobile machine, a controller, and a point cloud matching state confirmation method for an autonomous mobile machine. The autonomous mobile machine includes a controller, and the controller is configured to execute a program instruction to implement the following operations: obtaining an original point cloud and a target point cloud; registering the original point cloud and the target point cloud to obtain a Hessian matrix and a transformation matrix between the original point cloud and the target point cloud; calculating a matching error between the original point cloud and the target point cloud according to the Hessian matrix and the transformation matrix; and determining a matching state between the original point cloud and the target point cloud based on a comparison between the matching error and a first threshold range.

17 Claims, 6 Drawing Sheets

(51) Int. Cl.
*G06T 7/33* (2017.01)
*G06T 7/73* (2017.01)

(56) References Cited

U.S. PATENT DOCUMENTS

| | | | | |
|---|---|---|---|---|
| 2020/0043186 | A1* | 2/2020 | Selviah | G06T 7/33 |
| 2020/0090339 | A1* | 3/2020 | Doemling | G06V 10/426 |
| 2020/0401817 | A1* | 12/2020 | Schroeter | G06T 7/50 |
| 2023/0186494 | A1* | 6/2023 | Bosse | G06V 20/56 345/424 |
| 2023/0192123 | A1* | 6/2023 | Deng | B60W 60/001 701/23 |
| 2023/0204384 | A1* | 6/2023 | Kong | G01S 17/06 701/408 |
| 2023/0280465 | A1* | 9/2023 | Gruenwedel | G01S 7/4808 |
| 2024/0185379 | A1* | 6/2024 | Xia | G01C 21/3804 |
| 2024/0185595 | A1* | 6/2024 | Wang | G06V 10/993 |
| 2024/0210955 | A1* | 6/2024 | Vihonen | B66F 9/063 |
| 2024/0242369 | A1* | 7/2024 | Westman | G06T 5/40 |
| 2025/0137774 | A1* | 5/2025 | Zhao | G06T 17/00 |
| 2025/0148622 | A1* | 5/2025 | Ahuja | G01S 17/931 |

* cited by examiner

AUTONOMOUS MOBILE MACHINE, CONTROLLER, AND POINT CLOUD MATCHING STATE CONFIRMATION METHOD FOR AUTONOMOUS MOBILE MACHINE

TECHNICAL FIELD

Various example embodiments of the present disclosure relate to the field of warehousing, logistics, and manufacturing, and more particularly, to an autonomous mobile machine, a controller, and a point cloud matching state confirmation method for an autonomous mobile machine.

BACKGROUND

In the field of modern warehousing and logistics, efficient circulation of cargoes is crucial to enterprise operations. An unmanned forklift, as a new generation of intelligent logistics device, is gradually becoming one of key technologies for improving warehousing efficiency and reducing operation costs. The unmanned forklift, also referred to as an automated guided vehicle (AGV), relies on an autonomous driving technology and intelligent algorithm control, and can implement autonomous navigation, transportation, and stacking, effectively alleviating a labor shortage problem, and significantly improving overall efficiency of logistics operation.

In an actual application of a point cloud positioning technology, a current solution for evaluating a registration result obviously lacks in a complex scenario, and it is difficult to provide a proper and accurate evaluation of positioning quality. The quality of a registration result affects the accuracy of the unmanned forklift for environment perception, path planning, and cargo handling, and is of great significance for improving warehousing operation efficiency and safety.

BRIEF DESCRIPTION OF THE DRAWINGS

The accompanying drawings necessary for describing some embodiments of the present disclosure are briefly described below to facilitate description of the embodiments of the present disclosure. Apparently, the accompanying drawings in the following description are only some embodiments of the present disclosure. For a person skilled in the art, drawings of other embodiments may still be obtained based on the illustrations in these drawings without the need for creative work.

DETAILED DESCRIPTION OF THE DISCLOSURE

Figure 1:
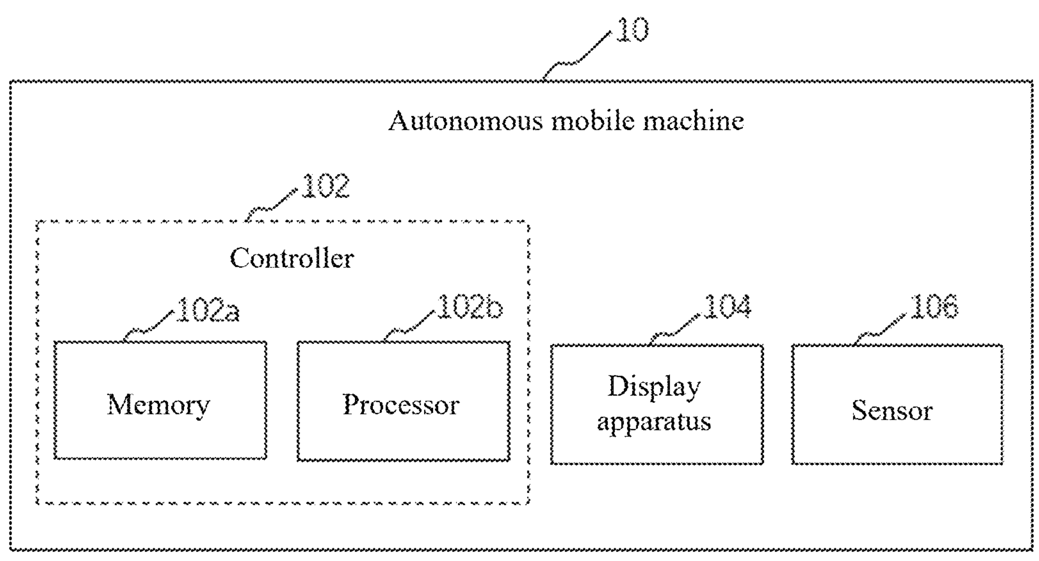
FIG. 1 is a schematic module diagram of an autonomous mobile machine according to some embodiments of the present disclosure.

The following descriptions with reference to the accompanying drawings are provided to help understand the present disclosure. The following discussion focuses on specific implementations and embodiments of the present disclosure. The focus is provided to help describe the teaching content, and should not be construed as a limitation to the scope or applicability of the teaching content. However, other embodiments may be used based on the teaching content disclosed in the present disclosure.

The terms "include" and "have" as used in the present disclosure, along with any variations thereof, are intended to cover non-exclusive inclusions. For example, a process, method, system, apparatus, product, or device that includes a series of operations or units is not necessarily limited to those operations or units explicitly listed, but may include other operations or units that are not explicitly listed or are inherent to the process, method, system, apparatus, product, or device.

The following disclosure provides a plurality of implementations or examples, which can be used to implement different features of the present disclosure. Specific examples of components and configurations described below are used to simplify the present disclosure. It may be conceived that these descriptions are merely for illustration, and are not intended to limit the present disclosure. For example, in the following description, terms such as "first" and "second" are used for distinguishing between different objects, rather than describing a specific order of the objects. For example, without departing from the scope of the present disclosure, a first parameter may be referred to as a second parameter, and similarly, a second parameter may be referred to as a first parameter. Furthermore, in the present disclosure, component symbols and/or numbers may be repeatedly used in a plurality of embodiments. The repeated use is based on an objective of brevity and clarity, and does not represent a relationship between different discussed embodiments and/or configurations discussed.

In addition, for ease of description, relative spatial terms such as "underneath", "below", "lower portion", "above", "upper", "lower", "left", and "right" may be used herein to describe a relationship between one component or feature and another component or feature as illustrated in the figures. In addition to the orientation depicted in the figures, the spatial relative terms are intended to cover different orientations of an apparatus during use or operation. A device may be oriented in another manner (rotated by 90 degrees or at another orientation), and relative spatial descriptors used herein may also be correspondingly explained. It should be understood that when a component is referred to as being "connected to" or "coupled to" another component, the component may be directly connected to or coupled to the another component, or an intermediate component may exist.

Although numerical ranges and parameters used to define the broad scope of the present disclosure are approximate values, relevant values in specific embodiments are presented as precisely as possible herein. However, any value essentially inevitably contains a standard deviation caused by an individual test method. Herein, "about" usually means that an actual value is within plus or minus 10%, 5%, 1%, or 0.5% of a particular value or range. Alternatively, the term "about" represents that an actual value falls within an acceptable standard error of an average value, and is determined according to consideration of a person of ordinary skill in the art to which the present disclosure pertains. It may be understood that except experimental examples, or unless otherwise clearly stated, all ranges, quantities, values, and percentages used herein are modified by "about". Therefore, unless otherwise specified to the contrary, numerical parameters disclosed in this specification and appended claims are approximate values, and may be changed according to requirements. These numerical parameters should be understood as at least a specified number of valid digits and a numerical value obtained by using a general carry method. Herein, a value range is represented as from one endpoint to the other endpoint or between two endpoints. Unless otherwise specified, numerical ranges described herein all include endpoints.

FIG. 1 is a schematic module diagram of an autonomous mobile machine according to some embodiments of the present disclosure.

As shown in FIG. 1, an autonomous mobile machine 10 includes a controller 102, a display apparatus 104, and a sensor 106. The controller 102 is operatively coupled to the display apparatus 104 and the sensor 106. The controller 102 may cooperate with the display apparatus 104 and the sensor 106 to implement a point cloud matching state confirmation method for an autonomous mobile machine proposed in the present disclosure.

The controller 102 may include a memory 102*a* and a processor 102*b*. The controller 102 may be disposed on the autonomous mobile machine 10. It should be noted that the present disclosure does not limit that the controller 102 is implemented in hardware, software, or a hardware/software combination. In some embodiments of the present disclosure, the controller 102 may be a plug and play apparatus. In some embodiments of the present disclosure, the controller 102 may be connected to the autonomous mobile machine 10 in a wired or wireless manner.

The memory 102*a* may be an integrated element. The memory 102*a* may be considered as including a plurality of storage units. Information, for example but not limited to, data information such as a point cloud and a pose of the autonomous mobile machine 10 may be stored in different storage units respectively or stored in a same storage unit.

The processor 102*b* may be an integrated element. The processor 102*b* may include a plurality of processing units. The processor 102*b* may read required data information from the memory 102*a*. The processor 102*b* may store data information in the memory 102*a*. The processor 102*b* may receive and process an input (e.g., a touch operation) of a user for the display apparatus 104 or data sensed by the sensor 106. The processor 102*b* is operatively coupled to the memory 102*a*, the display apparatus 104, and the sensor 106. The processor 102*b* may cooperate with the memory 102*a*, the display apparatus 104, and the sensor 106 to implement the point cloud matching state confirmation method for an autonomous mobile machine proposed in the present disclosure.

The display apparatus 104 may be a touchscreen. The display apparatus 104 may alternatively be a non-touchscreen. In some embodiments of the present disclosure, the autonomous mobile machine 10 may alternatively not include the display apparatus 104. The display apparatus 104 may be disposed on the autonomous mobile machine 10. Alternatively, the display apparatus 104 may not be disposed on the autonomous mobile machine 10. When the display apparatus 104 is not disposed on the autonomous mobile machine 10, the display apparatus 104 may be disposed at a remote end of the autonomous mobile machine 10, for example but not limited to, a remote control room.

The sensor 106 may be an integrated element. The sensor 106 may include a plurality of sensor elements. The sensor 106 may be, but is not limited to, a complementary metal oxide semiconductor sensor, a charge coupled machine sensor, a time of flight (TOF) sensor, or a laser radar. The sensor 106 may send acquired information to the controller 102. The sensor 106 may be disposed on the autonomous mobile machine 10. In some embodiments of the present disclosure, the autonomous mobile machine 10 may alternatively not include the sensor 106. The sensor 106 may be manually installed on the autonomous mobile machine 10 by a user before using the autonomous mobile machine 10.

The autonomous mobile machine 10 may be a machine capable of automatically or semi-automatically performing a handling task. Common forms of the autonomous mobile machine 10 include: a forklift, an AGV, an autonomous mobile robot (AMR), an anthropomorphic robot, a robotic arm, or the like. In some embodiments of the present disclosure, the autonomous mobile machine 10 may be an unmanned vehicle, for example, an unmanned forklift, applied to a warehouse.

Figure 2:
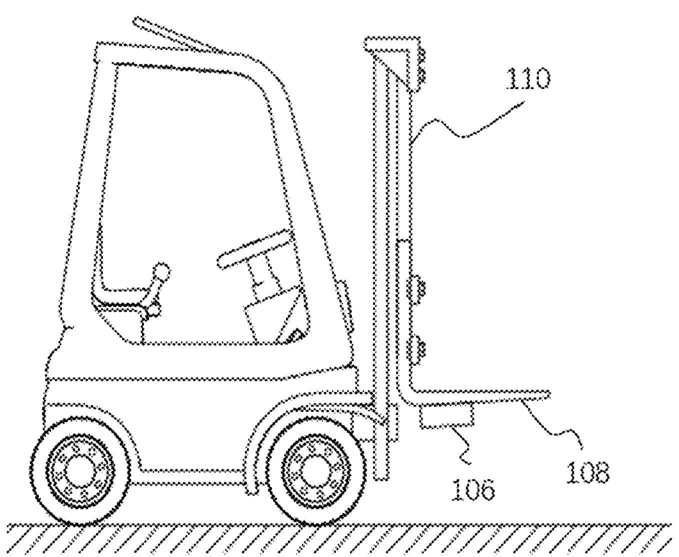
FIG. 2 is a schematic structural diagram of an autonomous mobile machine according to some embodiments of the present disclosure.

FIG. 2 is a schematic structural diagram of an autonomous mobile machine according to some embodiments of the present disclosure. The autonomous mobile machine shown in FIG. 2 is an unmanned forklift. However, it should be understood that, in another embodiment of the present disclosure, the autonomous mobile machine may alternatively have another form.

Figure 3:
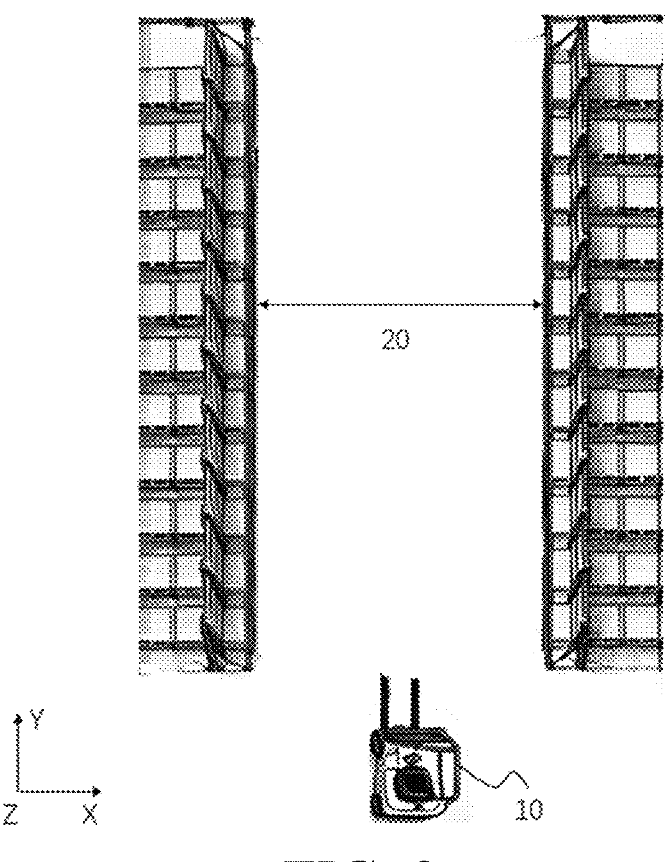
FIG. 3 is a schematic diagram of a scenario when an autonomous mobile machine faces a warehouse corridor according to some embodiments of the present disclosure.

As shown in FIG. 2, the autonomous mobile machine 10 includes a fork 108 and a gantry 110. The sensor 106 may be disposed on the autonomous mobile machine 10. In some embodiments of the present disclosure, the sensor 106 may be disposed on the fork 108 or the gantry 110. As shown in FIG. 3, the sensor 106 is disposed at a root of the fork 108.

FIG. 3 is a schematic diagram of a scenario when an autonomous mobile machine faces a warehouse corridor according to some embodiments of the present disclosure.

As shown in FIG. 3, the autonomous mobile machine 10 is in a scenario of facing a warehouse corridor 20. As shown in FIG. 3, the warehouse corridor 20 is a long corridor. In some embodiments of the present disclosure, the long corridor may be understood as: a channel having a length greater than or equal to a distance that is effectively detected by the laser radar of the autonomous mobile machine 10 and both sides being smooth wall surfaces without convex posts. The warehouse corridor 20 shown in FIG. 3 may have a Y direction extending along a length thereof, an X direction perpendicular to a wall surface 20*a* of the warehouse corridor 20, and a Z direction perpendicular to the X direction and the Y direction. In some embodiments of the present disclosure, the length of the warehouse corridor 20 in the Y direction is about 200 meters, and the distance effectively detected by the laser radar of the autonomous mobile machine 10 is about 50 meters. It should be understood that the warehouse corridor 20 in FIG. 3 is merely used for exemplary description, and is not a limitation of the present disclosure. In some embodiments of the present disclosure, the warehouse corridor 20 may be any type of warehouse corridor. In some embodiments of the present disclosure, the warehouse corridor 20 may alternatively be a short corridor. In some embodiments of the present disclosure, the autonomous mobile machine 10 may alternatively be used in any warehouse scenario. The warehouse scenario may be any complex scenario such as a high dynamic scenario in which industrial machines such as movable cargoes and autonomous mobile machines and personnel move, a highly similar space structure scenario including a similar structure, and/or a long corridor scenario. The autonomous mobile machine 10 may move along the Y direction. The autonomous mobile machine 10 may take cargoes from a corresponding area of the warehouse corridor 20 according to an instruction, precisely place the cargoes at a specified position, and dynamically plan a path with real-time data and avoid collision and improve operation efficiency with cooperation of the sensor 106 and the controller 102. It should be understood that a schematic diagram of a scenario when the autonomous mobile machine 10 faces the warehouse corridor 20 presented in FIG. 3 is merely used for exemplary description, and is not a limitation of the present disclosure. In addition, the autonomous mobile machine 10 is not limited to being applied to an unmanned forklift. In another embodiment, the autonomous mobile machine 10 may be any intelligent mobile apparatus. When the autonomous mobile machine 10 performs a task (e.g., but not limited to, rack inventory or cargo picking and placing) in an operation environment (e.g., but not limited to, warehousing), the processor 102*b* may drive the sensor 106 to scan an environment in real time.

Figure 4:
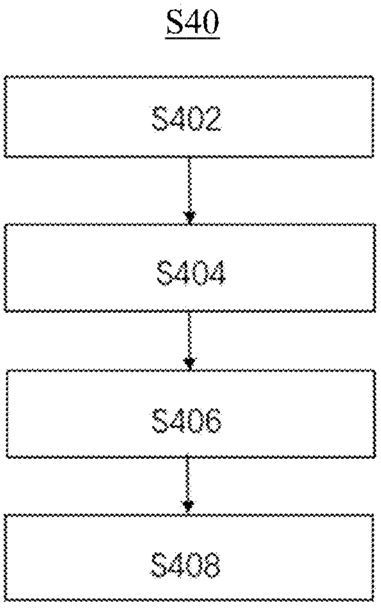
FIG. 4 is a schematic flowchart of a point cloud matching state confirmation method for an autonomous mobile machine according to some embodiments of the present disclosure.

FIG. 4 is a schematic flowchart of a point cloud matching state confirmation method for an autonomous mobile machine according to some embodiments of the present disclosure. When detection is performed by using a point cloud matching state confirmation method for an autonomous mobile machine according to some embodiments of the present disclosure, the autonomous mobile machine 10 first moves to a warehouse or the warehouse corridor 20. Then, the sensor 106 of the autonomous mobile machine 10 may acquire information about the warehouse or the warehouse corridor 20. After acquiring the information about the warehouse or the warehouse corridor 20, the controller 102 performs subsequent processing on the information, and performs corresponding operations, so as to finally implement a point cloud matching state confirmation method applied to the autonomous mobile machine 10.

As shown in FIG. 4, a point cloud matching state confirmation method S40 for an autonomous mobile machine includes operation S402, operation S404, operation S406, and operation S408.

The point cloud matching state confirmation method S40 for an autonomous mobile machine is performed by the controller 102 coupled to the display apparatus 104 and the sensor 106. More specifically, the program instruction stored in the memory 102*a* is configured to cause, by using the processor 102*b*, the autonomous mobile machine 10 to perform the point cloud matching state confirmation method S40 for an autonomous mobile machine.

In operation S402, an original point cloud and a target point cloud are obtained. In some embodiments of the present disclosure, the processor 102*b* may drive the sensor 106 to perform environment sensing to obtain the original point cloud. In some embodiments of the present disclosure, the target point cloud may be obtained by reading the memory 102*a*. In some embodiments of the present disclosure, the original point cloud is a real-time point cloud of a current position of the autonomous mobile machine 10, and is obtained by sensing an environment by the sensor 106. The target point cloud is a base point cloud that keeps still in a registration process, and is used for providing a spatial reference for an original point cloud to be registered. The target point cloud represents a standard state of a scenario, and has higher precision and completeness. In some embodiments of the present disclosure, the target point cloud may be a high-precision point cloud generated by scanning a scenario (e.g., but not limited to, a warehouse or a warehouse corridor) by using the sensor 106, and records a static structural feature (e.g., but not limited to, a ground, a wall surface, or a rack) in the scenario. In some embodiments of the present disclosure, the target point cloud may be a local map or a global map of the current position of the autonomous mobile machine 10.

Figure 5:
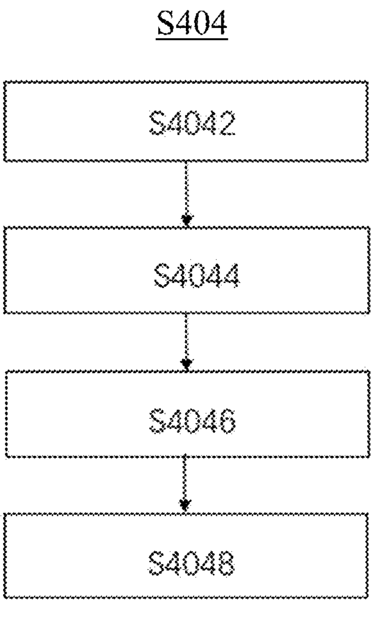
FIG. 5 is a specific schematic flowchart of registering an original point cloud and a target point cloud to obtain a Hessian matrix and a transformation matrix between the original point cloud and the target point cloud according to some embodiments of the present disclosure.

In operation S404, the original point cloud and the target point cloud are registered to obtain a Hessian matrix and a transformation matrix between the original point cloud and the target point cloud. FIG. 5 is a specific schematic flowchart of registering an original point cloud and a target point cloud to obtain a Hessian matrix and a transformation matrix between the original point cloud and the target point cloud according to some embodiments of the present disclosure.

As shown in FIG. 5, operation S404 includes: operation S4042, operation S4044, operation S4046, and operation S4048.

In operation S4042, transformation parameters of a coordinate system of the original point cloud relative to a coordinate system of the target point cloud are obtained. In some embodiments of the present disclosure, before registration is started, based on a previous frame of positioning result of the autonomous mobile machine 10 or a preset initial pose, transformation parameters (i.e., a yaw angle, a pitch angle, a roll angle, an X-axis translation, a Y-axis translation, and a Z-axis translation) are determined, to serve as a starting point for iteration.

In operation S4044, the transformation parameters are sorted. In some embodiments of the present disclosure, the transformation parameters are sorted in order of the yaw angle, the pitch angle, the roll angle, the X-axis translation, the Y-axis translation, and the Z-axis translation. In some other embodiments of the present disclosure, the transformation parameters may alternatively be sorted in another order.

In operation S4046, the original point cloud and the target point cloud are registered. In some embodiments of the the present disclosure, the original point cloud and the target point cloud may be registered in various manners. In some embodiments of the present disclosure, the original point cloud and the target point cloud may be registered by using one of a generalized iterative closest point (GICP) algorithm and an iterative closest point (ICP) algorithm. In some embodiments of the present disclosure, the original point cloud and the target point cloud may be registered by using the GICP algorithm based on a Levenberg-Marquardt algorithm (L-M algorithm). In some embodiments of the present disclosure, the original point cloud and the target point cloud may be registered by using a point-surface distance as a residual and using the GICP algorithm based on the L-M algorithm. The point-surface distance may be understood as that for each point in the original point cloud, a local plane to which the point belongs is found in the target point cloud (the local plane may be obtained by fitting neighborhood points of the target point cloud), and a vertical distance between the original point and the local plane is calculated. The vertical distance may be considered as a point-surface distance (or referred to as a residual) of a single point. Residuals of all original points may jointly form an error set. The iteration may be performed by using the GICP algorithm based on the L-M algorithm, so that a corresponding value (e.g., but not limited to, a sum of residuals) of the error set converges to a minimum value. Compared with a point-to-point residual, a point-surface distance is used as a residual to better adapt to a warehousing environment with abundant plane features, for example, a ground, a wall surface, or a rack facade, to reduce impact of local point cloud noise (e.g., but not limited to, a point cloud loss caused by dynamic object blocking) on registration precision. In a specific embodiment of the present disclosure, the registering the original point cloud and the target point cloud includes: converting the original point cloud from a sensor coordinate system to a coordinate system of the target point cloud based on sorted transformation parameters; and calculating a point-surface distance residual between the original point cloud and the target point cloud after the conversion; adjusting the sorted transformation parameters respectively, so that a residual of each parameter in the sorted transformation parameters is minimum, to generate a new sorted transformation parameter; and repeating the foregoing operations until a convergence condition is reached.

In operation S4048, the Hessian matrix and the transformation matrix are obtained when the registration reaches a convergence condition. In some embodiments of the present disclosure, when an absolute value of a change of the transformation parameter between two adjacent iterations is less than a threshold, it is determined that the registration reaches the convergence condition, and the iteration is stopped, to obtain the Hessian matrix and the transformation matrix. In some embodiments of the present disclosure, thresholds of the yaw angle, the pitch angle, and the roll angle are 0.001 rad. In some embodiments of the present disclosure, thresholds of the X-axis translation, the Y-axis translation, and the Z-axis translation are 0.01 mm. In some other embodiments of the present disclosure, the thresholds of the yaw angle, the pitch angle, and the roll angle may alternatively be other values or value ranges. In some other embodiments of the present disclosure, the thresholds of the X-axis translation, the Y-axis translation, and the Z-axis translation may alternatively be other values or value ranges. The Hessian matrix may be a 6×6-dimensional square matrix. The 6×6-dimensional Hessian matrix corresponds to six degrees of freedom transformation parameters (i.e., the yaw angle, the pitch angle, the roll angle, the X-axis translation, the Y-axis translation, and the Z-axis translation) of a pose of the autonomous mobile machine 10. The mathematical essence of the Hessian matrix is a second-order partial derivative set of a multivariate objective function in a point cloud registration optimization process. In other words, the Hessian matrix is a square matrix formed by a second-order partial derivative of a multivariate function. A matrix element in the Hessian matrix may represent an information density and a mutual coupling relationship in the degrees of freedom, and provides a data basis for subsequent extraction of a degraded feature point and weight calculation. A registered pose may represent a specific position and pose of the autonomous mobile machine 10 in the coordinate system of the target point cloud, and includes six degrees of freedom transformation parameters (i.e., the yaw angle, the pitch angle, the roll angle, the X-axis translation, the Y-axis translation, and the Z-axis translation) of the autonomous mobile machine 10 in the coordinate system of the target point cloud. A sorting order of the parameters in the registered pose may be consistent with an order of six degrees of freedom of the Hessian matrix.

Figure 6:
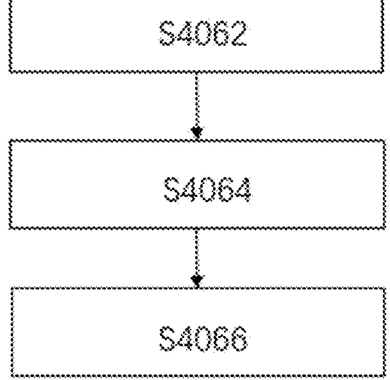
FIG. 6 is a specific schematic flowchart of calculating a matching error between an original point cloud and a target point cloud according to a Hessian matrix and a transformation matrix according to some embodiments of the present disclosure.

In operation S406, a matching error between the original point cloud and the target point cloud is calculated according to the Hessian matrix and the transformation matrix. FIG. 6 is a specific schematic flowchart of calculating a matching error between an original point cloud and a target point cloud according to a Hessian matrix and a transformation matrix according to some embodiments of the present disclosure.

As shown in FIG. 6, operation S406 includes operation S4062, operation S4064, and operation S4066.

In operation S4062, an eigenparameter related to a coordinate value is calculated according to the Hessian matrix. In some embodiments of the present disclosure, a first matrix related to the coordinate value is extracted from the Hessian matrix. In some embodiments of the present disclosure, only a first matrix related to an X coordinate value and a Y coordinate value may be extracted from the Hessian matrix. Since an active area of the autonomous mobile machine 10 in warehouse logistics is mostly a plane, more attention is paid to distribution of point clouds in the X direction and the Y direction, and less attention is paid to other four degrees of freedom (i.e., the yaw angle, the pitch angle, the roll angle, and the Z-axis translation). Therefore, only the first matrix related to the X coordinate value and the Y coordinate value may be extracted from the Hessian matrix. When the transformation parameters are sorted in order of the yaw angle, the pitch angle, the roll angle, the X-axis translation, the Y-axis translation, and the Z-axis translation, two rows and two columns in the Hessian matrix should be taken out as the first matrix related to the X coordinate value and the Y coordinate value, where a start position is in a third row and a third column in the Hessian matrix. In some embodiments of the present disclosure, after the first matrix related to the coordinate value is extracted, eigenvalue decomposition may be performed on the first matrix, to obtain an eigenvalue and an eigenvector. Since the first matrix is a matrix with two rows and two columns, a first eigenvalue, a second eigenvalue, and a first eigenvector and a second eigenvector respectively corresponding to the first eigenvalue and the second eigenvalue may be determined according to the first matrix. In some embodiments of the present disclosure, the first eigenvalue and the second eigenvalue may be sorted according to a rule, and sorting of respective eigenvectors thereof is correspondingly adjusted. In some embodiments of the present disclosure, the first eigenvalue and the second eigenvalue may be sorted in an ascending order, and sorting of respective eigenvectors thereof is correspondingly adjusted.

Figure 7:
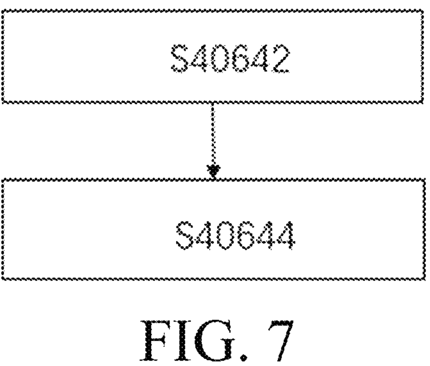
FIG. 7 is a specific schematic flowchart of transforming an original point cloud into a first point cloud via a transformation matrix and determining a first parameter of the first point cloud according to some embodiments of the present disclosure.

In operation S4064, the original point cloud is transformed into a first point cloud via the transformation matrix, and a first parameter of the first point cloud is determined. FIG. 7 is a specific schematic flowchart of transforming an original point cloud into a first point cloud via a transformation matrix and determining a first parameter of the first point cloud according to some embodiments of the present disclosure.

As shown in FIG. 7, operation S4064 includes operation S40642 and operation S40644.

In operation S40642, the original point cloud is transformed into a first point cloud via the transformation matrix. In some embodiments of the present disclosure, after the transformation matrix is obtained in operation S4048, the original point cloud may be transformed into the first point cloud via the transformation matrix. An objective of operation S40642 is to convert the original point cloud from the sensor coordinate system to the coordinate system of the target point cloud, so that the original point cloud and the target point cloud are in a same coordinate system. In some embodiments of this disclosure, the transforming the original point cloud into a first point cloud via the transformation matrix includes: traversing each point in the original point cloud; performing conversion calculation on coordinates of each point by using the transformation matrix; and gather coordinates of all the converted points, to form new point cloud data (i.e., the first point cloud).

Figure 8:
FIG. 8 is a specific schematic flowchart of calculating a matching error between an original point cloud and a target point cloud based on an eigenparameter, a first point cloud, and a first parameter according to some embodiments of the present disclosure.
Figure 8:
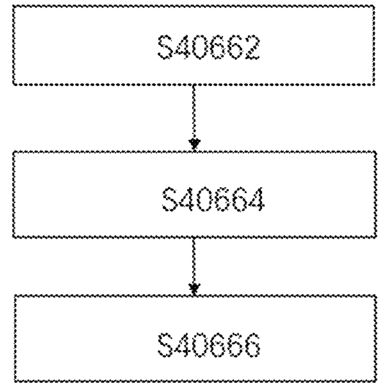

In operation S40644, a first parameter of the first point cloud is determined. In some embodiments of the present disclosure, the determining a first parameter of the first point cloud includes determining normal vector of points in the first point cloud. In some embodiments of the present disclosure, the determining normal vector of points in the first point cloud includes: setting a search range for each point in the first point cloud; searching for all neighborhood points of each point within the search range; calculating the neighborhood points of each point, to fit a plane most conforming to the points; calculating, according to the fitted plane, a direction perpendicular to the plane (the direction is a normal vector direction of the point); and repeatedly performing the foregoing operations until the normal vectors of the points in the first point cloud are calculated. In operation S4066, a matching error between the original point cloud and the target point cloud is calculated based on the eigenparameter, the first point cloud, and the first parameter. FIG. 8 is a specific schematic flowchart of calculating a matching error between an original point cloud and a target point cloud based on an eigenparameter, a first point cloud, and a first parameter according to some embodiments of the present disclosure.

As shown in FIG. 8, operation S4066 includes operation S40662, operation S40664, and operation S40666.

In operation S40662, dimensionality augmentation is performed on the eigenvector, to obtain a dimensionality-augmented eigenvector. In some embodiments of the present disclosure, when the first matrix related to the coordinate value extracted from the Hessian matrix is a matrix with two rows and two columns (i.e., a two-dimensional matrix), dimensionality augmentation needs to be performed on the eigenvector corresponding to the first matrix. The reason why dimensionality augmentation is performed on the eigenvector corresponding to the first matrix is that a normal vector of each point in the first point cloud is three-dimensional, while the eigenvector corresponding to the first matrix is two-dimensional. Therefore, dimensionality augmentation needs to be performed on the eigenvector corresponding to the first matrix, to implement dimensionality consistency with a normal vector of each point in the first point cloud. In some embodiments of the present disclosure, the performing dimensionality augmentation on the eigenvector corresponding to the first matrix includes: an original eigenvector is V=(a, b), and a dimensionality-augmented eigenvector is V=(a, b, 0).

In operation S40664, a point, in the first point cloud, having an absolute value of a dot product of the normal vector and the dimensionality-augmented eigenvector is greater than a second threshold range, is reserved to obtain a second point cloud. In some embodiments of the present disclosure, whether an absolute value of a dot product of a normal vector of each point in the first point cloud and the eigenvector is greater than a second threshold range is cyclically determined. If the absolute value is greater than the second threshold range, the point is reserved for participating in subsequent matching calculation. If the absolute value is less than the second threshold range, the point is discarded. Finally, a remaining point cloud of the first point cloud is used as the second point cloud. In some embodiments of the present disclosure, the second threshold range is 0.4 to 0.8.

Figure 9:
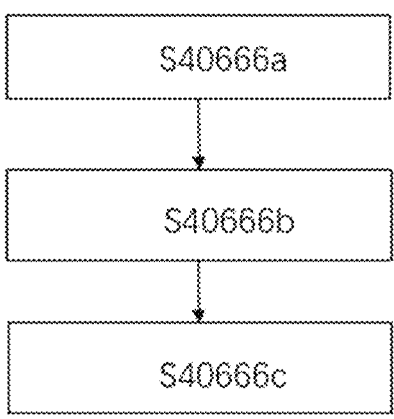
FIG. 9 is a specific schematic flowchart of calculating a matching error between an original point cloud and a target point cloud based on an eigenvalue, a dimensionality-augmented eigenvector, a second point cloud, and normal vectors of points in the second point cloud according to some embodiments of the present disclosure.

In operation S40666, a matching error between the original point cloud and the target point cloud is calculated based on the eigenvalue, the dimensionality-augmented eigenvector, the second point cloud, and normal vectors of points in the second point cloud. FIG. 9 is a specific schematic flowchart of calculating a matching error between an original point cloud and a target point cloud based on an eigenvalue, a dimensionality-augmented eigenvector, a second point cloud, and normal vectors of points in the second point cloud according to some embodiments of the present disclosure.

As shown in FIG. 9, operation S40666 includes operation S40666*a*, operation S40666*b*, and operation S40666*c*.

In operation S40666*a*, weights of the points are calculated based on the eigenvalue, the dimensionality-augmented eigenvector, and the normal vectors of the points in the second point cloud. In some embodiments of the present disclosure, when the first matrix related to the coordinate value extracted from the Hessian matrix is a matrix with two rows and two columns, the weights of the points in the second point cloud are calculated by using the following formula:

$$w = \sqrt{\left(n * v1 * \frac{\text{lambda\_2}}{\text{lambda\_1} + \text{lambda\_2}}\right)^2 + \left(n * v2 * \frac{\text{lambda\_1}}{\text{lambda\_1} + \text{lambda\_2}}\right)^2}$$

where lambda_1 is the first eigenvalue, lambda_2 is the second eigenvalue, v1 is the first eigenvector, v2 is the second eigenvector, and n is a normal vector of a point in the second point cloud.

In operation S40666*b*, a nearest neighbor point, in the target point cloud, of a point in the second point cloud is searched and a distance between the point and the nearest neighbor point is calculated. The searching for a nearest neighbor point, in the target point cloud, of a point in the second point cloud and calculating a distance between the point and the nearest neighbor point includes searching for the nearest neighbor point by using one of the following algorithms: KD-Tree, octree, binary tree, and brute-force search. In some embodiments of the present disclosure, three-dimensional coordinates (x, y, z) of a current point in the second point cloud are used as a search center to match a point having a smallest distance (i.e., a nearest neighbor point) in the target point cloud, and a distance between the nearest neighbor point and the current point is recorded.

Figure 10:
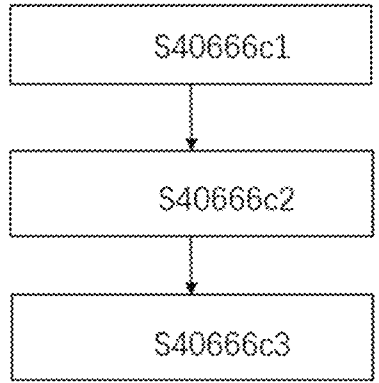
FIG. 10 is a specific schematic flowchart of calculating a matching error between an original point cloud and a target point cloud based on a weight and a distance according to some embodiments of the present disclosure.

In operation S40666*c*, a matching error between the original point cloud and the target point cloud is calculated based on the weight and the distance. FIG. 10 is a specific schematic flowchart of calculating a matching error between an original point cloud and a target point cloud based on a weight and a distance according to some embodiments of the present disclosure.

As shown in FIG. 10, operation S40666*c* includes operation S40666*c*1, operation S40666*c*2, and operation S40666*c*3.

In operation S40666*c*1, the weight is multiplied by the distance, to obtain a first distance.

In operation S40666*c*2, the first distances and the weights of all points in the second point cloud are accumulated, to obtain a second distance and a first weight, respectively. In some embodiments of the present disclosure, first distances of all points in the second point cloud are accumulated to obtain a second distance, and weights of all the points in the second point cloud are accumulated to obtain a first weight.

In operation S40666*c*3, the second distance is divided by the first weight, to obtain the matching error.

In operation S408, a matching state between the original point cloud and the target point cloud is determined based on a comparison between the matching error and a first threshold range. In some embodiments of the present disclosure, the matching error is determined as a reasonable matching error when the matching error is within a first threshold range. In some embodiments of the present disclosure, the first threshold range is 0.06 to 0.12.

In some embodiments of the present disclosure, the point cloud matching state confirmation method S40 for an autonomous mobile machine may further include: when the matching error falls within the first threshold range, controlling the autonomous mobile machine to continue to execute a current task; and when the matching error is outside the first threshold range, controlling the autonomous mobile machine to suspend a current task. Specifically, when the matching error falls within the first threshold range, it means that a current point cloud matching result of the autonomous mobile machine is reliable, and spatial alignment precision between the original point cloud and the target point cloud satisfies an operational requirement. For example, when the autonomous mobile machine forks a cargo, the error range can ensure that the autonomous mobile machine can stably and accurately move along a planned path without deviating from a task trajectory due to a positioning deviation. In this case, the autonomous mobile machine is controlled to continue to execute the current task, so that not only operation precision can be ensured, but also continuity of a task procedure can be maintained, thereby preventing an unnecessary interrupt from affecting efficiency. However, when the matching error is outside the first threshold range, it indicates that current point cloud matching precision of the autonomous mobile machine does not reach a standard, and a positioning abnormality may exist. If a task continues to be executed, risks are easily caused. For example, the autonomous mobile machine may collide with a rack or deviate from a route. In this case, the autonomous mobile machine is controlled to suspend the current task, so as to ensure operation safety in priority, and reserve time for a subsequent abnormal troubleshooting, thereby avoiding a worse problem caused by expansion of a positioning deviation.

The autonomous mobile machine, the controller, and the point cloud matching state confirmation method for an autonomous mobile machine according to the embodiments of the present disclosure have the following advantages: (1) a proper and reliable positioning quality evaluation can be provided for a degraded or near-degraded scenario; (2) the present disclosure is applicable to various warehouse logistics environments, and in particular, applicable to long warehouse corridors belonging to typical degradation scenarios; (3) there is no additional hardware cost, only an existing sensor and controller of the autonomous mobile machine 10 are relied upon, and no new sensor is needed, thereby reducing deployment costs; and (4) both timeliness and safety are balanced.

It should be noted that reference to "an embodiment of the present disclosure" or similar terms throughout this specification means that a particular feature, structure, or characteristic described in connection with another embodiment is included in at least one embodiment and may not necessarily be presented in all embodiments. Therefore, corresponding appearances of the phrase "an embodiment of the present disclosure" or similar terms in various places throughout this specification do not necessarily refer to a same embodiment. Furthermore, the particular feature, structure, or characteristic of any particular embodiment may be combined with one or more other embodiments in any suitable manner.

The technical content and technical features of the present invention have been disclosed as above. However, a person skilled in the art may still make various replacements and modifications without departing from the spirit of the present invention based on the teachings and disclosures of the present invention. Therefore, the protection scope of the present invention should not be limited to the content disclosed in the embodiments, but should include various replacements and modifications that do not depart from the present invention and are covered by the claims of this patent disclosure.

We claim:

1. An autonomous mobile machine, the autonomous mobile machine comprising a controller, the controller being configured to execute a program instruction to implement the following operations:

obtaining an original point cloud and a target point cloud, the original point cloud being a real-time point cloud of a current position of the autonomous mobile machine and the target point cloud being a local map or a global map of the current position of the autonomous mobile machine;

registering the original point cloud and the target point cloud to obtain a Hessian matrix and a transformation matrix between the original point cloud and the target point cloud;

calculating a matching error between the original point cloud and the target point cloud according to the Hessian matrix and the transformation matrix; wherein calculating a matching error between the original point cloud and the target point cloud according to the Hessian matrix and the transformation matrix comprises: transforming the original point cloud into a first point cloud via the transformation matrix; and determining normal vectors of points in the first point cloud; and determining a matching state between the original point cloud and the target point cloud based on a comparison between the matching error and a first threshold range;

when the matching error falls within the first threshold range, controlling the autonomous mobile machine to continue to execute a current task; and when the matching error is outside the first threshold range, controlling the autonomous mobile machine to suspend a current task.

2. The autonomous mobile machine according to claim 1, wherein the registering the original point cloud and the target point cloud to obtain a Hessian matrix and a transformation matrix between the original point cloud and the target point cloud comprises:

obtaining transformation parameters of a coordinate system of the original point cloud relative to a coordinate system of the target point cloud;

sorting the transformation parameters;

registering the original point cloud and the target point cloud; and obtaining the Hessian matrix and the transformation matrix when the registration reaches a convergence condition.

3. The autonomous mobile machine according to claim 1, wherein the original point cloud and the target point cloud are registered by using one of the following algorithms: a generalized iterative closest point (GICP) algorithm and an iterative closest point (ICP) algorithm.

4. The autonomous mobile machine according to claim 3, wherein the original point cloud and the target point cloud are registered by using the GICP algorithm based on a Levenberg-Marquardt algorithm (L-M algorithm).

5. The autonomous mobile machine according to claim 1, wherein the calculating a matching error between the original point cloud and the target point cloud according to the Hessian matrix and the transformation matrix comprises:

calculating, according to the Hessian matrix, an eigenparameter related to a coordinate value; and calculating a matching error between the original point cloud and the target point cloud based on the eigenparameter, the first point cloud, and the normal vectors.

6. The autonomous mobile machine according to claim 5, wherein the calculating, according to the Hessian matrix, an eigenparameter related to a coordinate value comprises:

extracting, from the Hessian matrix, a first matrix related to the coordinate value; and performing eigenvalue decomposition on the first matrix, to obtain eigenvalues and eigenvectors.

7. The autonomous mobile machine according to claim 6, wherein the operation further comprises: sorting the eigenvalues in an ascending order, and correspondingly adjusting sorting of the eigenvectors.

8. The autonomous mobile machine according to claim 1, wherein the operation further comprises:

determining the matching error as a reasonable matching error when the matching error is within a first threshold range.

9. The autonomous mobile machine according to claim 8, wherein the first threshold range is 0.06 to 0.12.

10. The autonomous mobile machine according to claim 1, wherein the calculating a matching error between the original point cloud and the target point cloud based on the eigenparameter, the first point cloud, and the normal vectors first parameter comprises:

performing dimensionality augmentation on the eigenvector, to obtain a dimensionality-augmented eigenvector;

reserving a point, in the first point cloud, having an absolute value of a dot product of the normal vector and the dimensionality-augmented eigenvector is greater than a second threshold range, to obtain a second point cloud; and calculating a matching error between the original point cloud and the target point cloud based on the eigenvalue, the dimensionality-augmented eigenvector, the second point cloud, and normal vectors of points in the second point cloud.

11. The autonomous mobile machine according to claim 10, wherein the second threshold range is 0.4 to 0.8.

12. The autonomous mobile machine according to claim 10, wherein the calculating a matching error between the original point cloud and the target point cloud based on the eigenvalue, the dimensionality-augmented eigenvector, the second point cloud, and normal vectors of points in the second point cloud comprises:

calculating weights of the points based on the eigenvalue, the dimensionality-augmented eigenvector, and the normal vectors of the points in the second point cloud;

searching for a nearest neighbor point, in the target point cloud, of a point in the second point cloud and calculating a distance between the point and the nearest neighbor point; and calculating a matching error between the original point cloud and the target point cloud based on the weight and the distance.

13. The autonomous mobile machine according to claim 12, wherein the eigenvalue comprises a first eigenvalue and a second eigenvalue, the dimensionality-augmented eigenvector comprises a first eigenvector and a second eigenvector, and the calculating weights of the points based on the eigenvalue, the dimensionality-augmented eigenvector, and the normal vectors of the points in the second point cloud comprises:

calculating the weight by using the following formula:

$$w = \sqrt{\left(n * v1 * \frac{\text{lambda\_2}}{\text{lambda\_1} + \text{lambda\_2}}\right)^2 + \left(n * v2 * \frac{\text{lambda\_1}}{\text{lambda\_1} + \text{lambda\_2}}\right)^2}$$

wherein lambda_1 is the first eigenvalue, lambda_2 is the second eigenvalue, v1 is the first eigenvector, v2 is the second eigenvector, and n is a normal vector of a point in the second point cloud.

14. The autonomous mobile machine according to claim 12, wherein the searching for a nearest neighbor point, in the target point cloud, of a point in the second point cloud and calculating a distance between the point and the nearest neighbor point comprises:

searching for the nearest neighbor point by using one of the following algorithms: KD-Tree, octree, binary tree, and brute-force search.

15. The autonomous mobile machine according to claim 12, wherein the calculating a matching error between the original point cloud and the target point cloud based on the weight and the distance comprises:

multiplying the weight by the distance, to obtain a first distance;

accumulating the first distances and the weights of all points in the second point cloud, to obtain a second distance and a first weight, respectively; and dividing the second distance by the first weight, to obtain the matching error.

16. A controller, configured to execute a program instruction, to implement the following operations:

obtaining an original point cloud and a target point cloud, the original point cloud being a real-time point cloud of a current position of the autonomous mobile machine and the target point cloud being a local map or a global map of the current position of the autonomous mobile machine;

registering the original point cloud and the target point cloud to obtain a Hessian matrix and a transformation matrix between the original point cloud and the target point cloud;

calculating a matching error between the original point cloud and the target point cloud according to the Hessian matrix and the transformation matrix, wherein calculating a matching error between the original point cloud and the target point cloud according to the Hessian matrix and the transformation matrix comprises: transforming the original point cloud into a first point cloud via the transformation matrix; and determining normal vectors of points in the first point cloud;

determining a matching state between the original point cloud and the target point cloud based on a comparison between the matching error and a first threshold range;

when the matching error falls within the first threshold range, controlling the autonomous mobile machine to continue to execute a current task; and when the matching error is outside the first threshold range, controlling the autonomous mobile machine to suspend a current task.

17. A point cloud matching state confirmation method for an autonomous mobile machine, the method comprising:

obtaining an original point cloud and a target point cloud, the original point cloud being a real-time point cloud of a current position of the autonomous mobile machine and the target point cloud being a local map or a global map of the current position of the autonomous mobile machine;

registering the original point cloud and the target point cloud to obtain a Hessian matrix and a transformation matrix between the original point cloud and the target point cloud;

calculating a matching error between the original point cloud and the target point cloud according to the Hessian matrix and the transformation matrix, wherein calculating a matching error between the original point cloud and the target point cloud according to the Hessian matrix and the transformation matrix comprises: transforming the original point cloud into a first point cloud via the transformation matrix; and determining normal vectors of points in the first point cloud;

determining a matching state between the original point cloud and the target point cloud based on a comparison between the matching error and a first threshold range;

when the matching error falls within the first threshold range, controlling the autonomous mobile machine to continue to execute a current task; and when the matching error is outside the first threshold range, controlling the autonomous mobile machine to suspend a current task.

* * * * *